United States Patent
Anghel et al.

(10) Patent No.: US 8,324,747 B2
(45) Date of Patent: Dec. 4, 2012

(54) STARTING METHOD FOR BRUSHLESS WOUND FIELD STARTER-GENERATOR WITHOUT ROTATING DIODE RECTIFIER

(75) Inventors: Cristian Anghel, Oro Valley, AZ (US); Ming Xu, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 360 days.

(21) Appl. No.: 12/834,186

(22) Filed: Jul. 12, 2010

(65) Prior Publication Data

US 2012/0007360 A1    Jan. 12, 2012

(51) Int. Cl.
     *H02P 5/00*      (2006.01)
(52) U.S. Cl. .......................................... 290/31
(58) Field of Classification Search ....... 290/31
See application file for complete search history.

(56) References Cited

U.S. PATENT DOCUMENTS

| | | | | |
|---|---|---|---|---|
| 2,397,183 A * | 3/1946 | Kilgore et al. | ............ | 416/40 |
| 2,620,461 A * | 12/1952 | Summers | ............ | 318/137 |
| 4,139,807 A * | 2/1979 | Hucker | ............ | 318/718 |
| 4,315,442 A | 2/1982 | Cordner | | |
| 5,283,471 A * | 2/1994 | Raad | ............ | 290/46 |
| 5,714,821 A * | 2/1998 | Dittman | ............ | 310/179 |
| 7,122,994 B2 | 10/2006 | Anghel et al. | | |
| 2004/0027077 A1* | 2/2004 | Xu et al. | ............ | 318/107 |
| 2004/0113592 A1* | 6/2004 | Adams | ............ | 322/27 |
| 2011/0140560 A1* | 6/2011 | Nickoladze et al. | ............ | 310/112 |

FOREIGN PATENT DOCUMENTS

| GB | 1485631 A | * | 9/1977 |
|---|---|---|---|
| JP | 62247743 A | * | 10/1987 |

* cited by examiner

*Primary Examiner* — Joseph Waks
(74) *Attorney, Agent, or Firm* — Shimokaji & Assoc., PC (57) ABSTRACT

A starting system may include a wound-field electric machine with a main generator and an exciter generator. The main generator and the exciter generator may each have stator windings and rotor windings. A shorting switch may be provided for interconnecting the stator windings of the exciter generator together when power is applied to stator windings of the main generator. This may result in starting torque being produced by the exciter generator, which starting torque may be additive to starting torque produced by the main generator.

20 Claims, 8 Drawing Sheets

STARTING METHOD FOR BRUSHLESS WOUND FIELD STARTER-GENERATOR WITHOUT ROTATING DIODE RECTIFIER

BACKGROUND OF THE INVENTION

The present invention generally relates to electric machines which may be employed as starter-generators.

In many types of vehicles, an electric machine may be employed, in a motor mode, to start an engine. After the engine is running, the electric machine may be employed, in a generator mode, to extract power from the engine and to supply electrical power to various electrical loads of the vehicle. It has been found advantageous to employ brushless wound-field electric machines as starter-generators, particularly in vehicles such as aircraft or ground vehicles.

A typical wound field starter-generator may be operated in a start mode with AC power supplied to an exciter stator through an excitation control unit. An exciter rotor may produce AC excitation current which may be transferred, through rotor-mounted diodes, as DC current in a main rotor of the electric machine. Additionally, controlled frequency power may be supplied to a main stator. The controlled frequency power may be provided through a high-power inverter unit which may vary the frequency of the input power as a function of rotational speed of a rotor of the electric machine. The frequency of the power to the main stator varies so that the electric machine produces torque throughout its speed range (i.e., from start-up to starter drop-off speed).

There are alternative types of starter-generators that do not contain rotor-mounted diodes and have a direct connection between the exciter rotor windings and the main rotor windings. In either of these types of starter-generators, excitation power may be provided through position-controlled (i.e., speed sensitive) controllers so that torque may be produced throughout a speed range of the electric machine.

In either of these types of starting systems, there is a need for high-power inverters which may deliver controlled frequency power to the electric machine. Such inverters may add cost and weight to a vehicle.

As can be seen, there is a need for a system of operating a wound-field electric machine, in a start mode, without a requirement to supply controlled frequency power to the electric machine. More particularly, there is a need for such a starting system which may be operated with introduction of constant frequency power to a main stator of the electric machine.

SUMMARY OF THE INVENTION

In one aspect of the present invention, a starting system may comprise a wound-field electric machine comprising: a main generator with main stator windings and main rotor windings; an exciter generator with exciter stator windings and exciter rotor windings; a shorting switch for interconnecting the exciter stator winding together when the electric machine is operated in a starting mode so that at least a portion of starting torque is produced by the exciter generator; and wherein the exciter rotor windings and the main rotor windings are connected.

In another aspect of the present invention, a wound field electric machine may comprise a main generator with main stator windings and main rotor windings; an exciter generator with exciter stator windings and exciter rotor windings; and wherein the exciter stator windings are shorted together when the electric machine is operated in a starting mode.

In still another aspect of the present invention, a method for starting an engine with an electric machine may comprise the steps of: shorting the exciter stator windings together; supplying power to main stator windings of the electric machine when the electric machine is operated in a starting mode; producing current in exciter rotor windings of the electric machine by application of power to the main stator windings; producing voltage in exciter stator windings with the produced exciter rotor windings current; and producing starting torque with an exciter generator of the electric machine which torque is additive to torque produced by a main generator of the electric machine.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a starting system with a wound-field electric machine which is operable in a starting mode with application of constant frequency power to main stator windings. Starting torque of the electric machine may be increased by interconnecting stator exciter windings together in a short circuit configuration.

Figure 1:
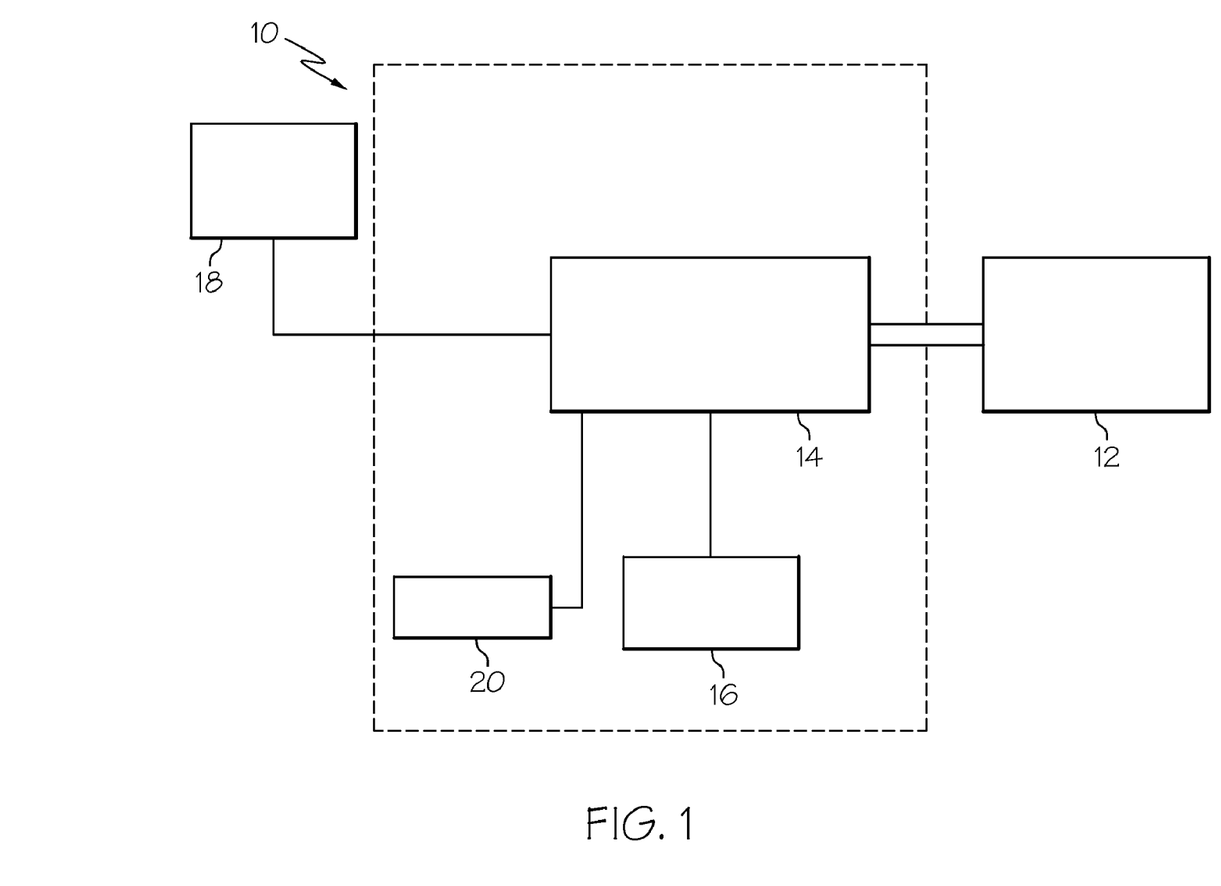
FIG. 1 is a block diagram of a starter/generator system in accordance with an embodiment of the invention.

Referring now to FIG. 1, a block diagram illustrates a starter/generator system 10 which may include an electric machine 14 operated as a starter-generator connected to an engine 12. The starter-generator system 10 may comprise the electric machine 14 and a generator control unit (GCU) 16, and a power supply 20. In operation, the electric machine 14 may be used to start the engine 12. Additionally, the electric machine 14 may produce electrical power for electrical loads 18 when driven by the engine 12. In an exemplary embodiment of the invention, the electric machine 14 may be supplied with electrical power from a power supply 20 when the electric machine 14 operates in a starting mode. Advantageously, the power supply 20 may be a constant frequency (CF) power supply, but variable frequency (VF) power supply may be used.

Figure 2:
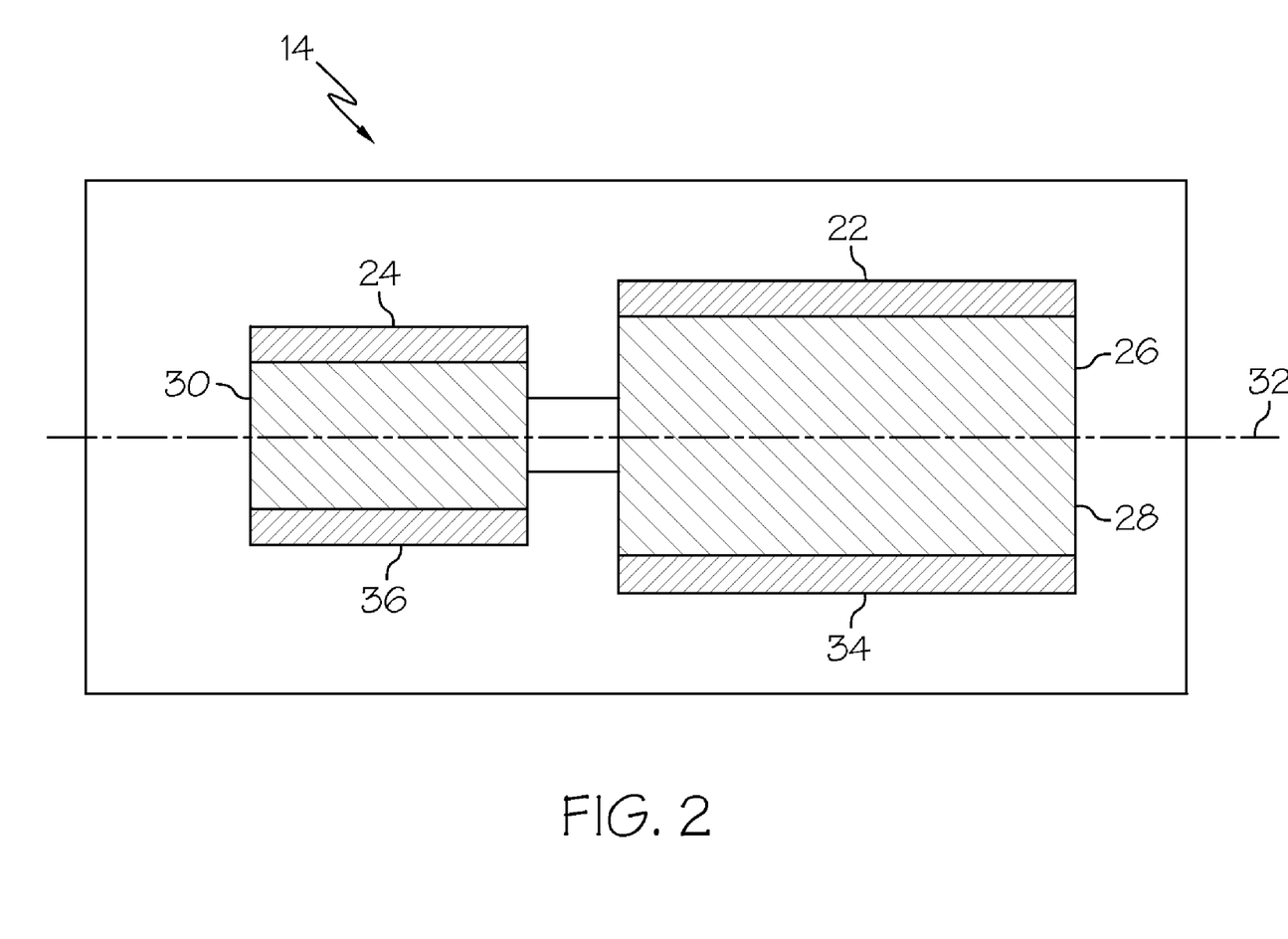
FIG. 2 is a block diagram of an electric machine of the starting system of FIG. 1 in accordance with an embodiment of the invention.

Referring now to FIG. 2, a schematic diagram may illustrate various features of the electric machine 14. The electric machine 14 may comprise a main generator 22 and an exciter generator 24. A rotor assembly 26 may be constructed with a main rotor winding 28 and an exciter rotor winding 30 wound so that they both rotate together on a single axis 32. A main stator winding 34 may surround the main rotor winding 28. An exciter stator winding 36 may surround the exciter rotor winding 30.

Figure 3:
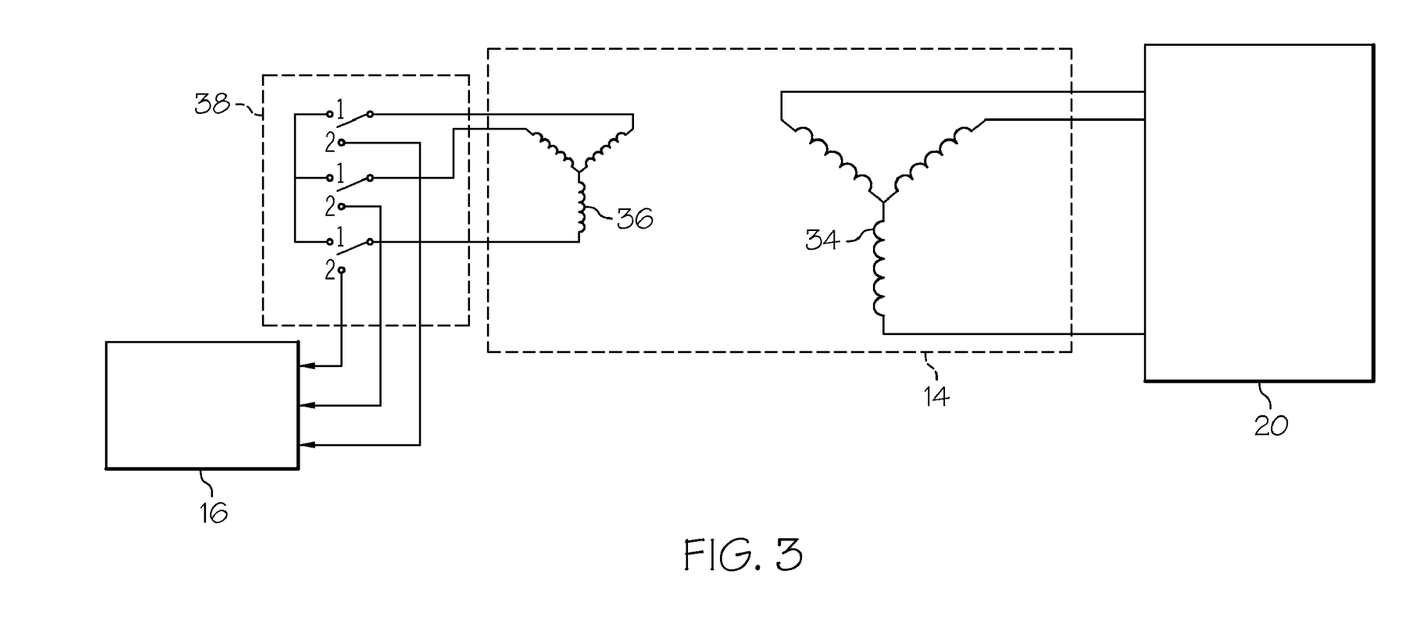
FIG. 3 is a block diagram of an interconnection configuration of stator portions of the electric machine of FIG. 2 in accordance with an embodiment of the invention.

Referring now to FIG. 3, an electrical block diagram may illustrate electrical interconnections of an exemplary embodiment of the invention. For purposes of simplicity, only electrical interconnections of the exciter stator windings 36 and the main stator windings 34 are shown. Rotor-winding interconnections are not illustrated in FIG. 3, but are shown in subsequent figures.

The main stator windings 34, shown in an exemplary three phase configuration, may be connected to the power supply 20 which may be a constant frequency (CF) source of power. For an aircraft application, the power source may be a ground-based power supply or an auxiliary power unit (APU) of the aircraft. The exciter stator windings 36, shown in an exemplary three-phase configuration may be interconnected with the GCU 16 through a shorting switch 38. In a starting mode of the electric machine 14 the switch 38 may be in closed position so that the exciter stator windings 36 may be shorted together. In a generating mode of the electric machine 14 the switch 38 may be in an open position so the exciter stator windings 36 may be connected in a conventional manner to the GCU 16.

Figure 4:
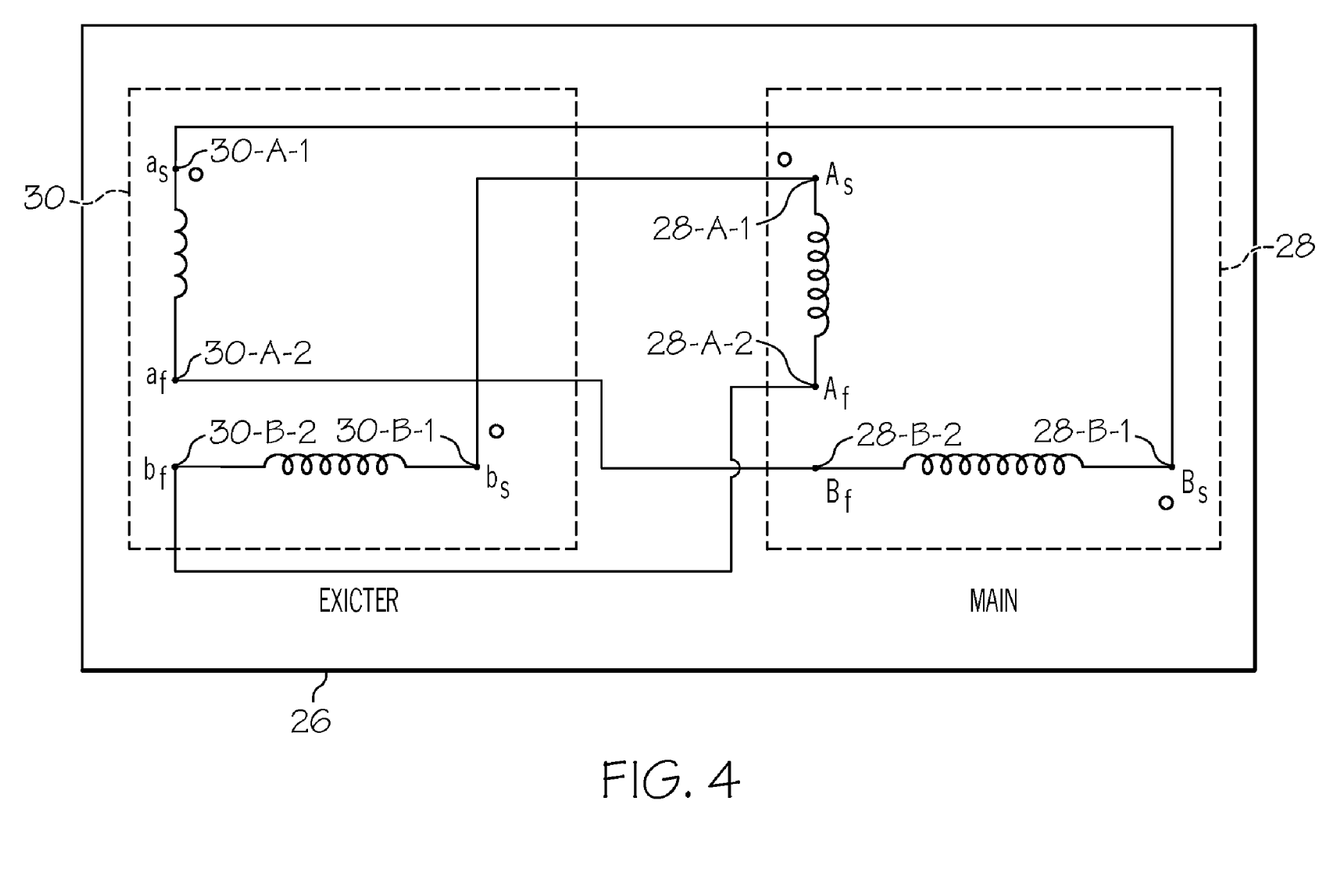
FIG. 4 is a block diagram of rotor portions of the electric machine of FIG. 2 in accordance with an embodiment of the invention.

Referring now to FIG. 4, the rotor windings of the electric machine 14 may be illustrated in a two phase configuration. As described above, with respect to FIG. 2, the main rotor windings 28 and the exciter rotor windings 30 may be wound in a single rotor assembly 26. The main rotor windings 28 and the exciter rotor windings 30 may be electrically interconnected in a reverse connection configuration as shown in FIG. 4. This may be understood by considering how A phases and B phases of the respective windings may be interconnected.

A starting point 28-A-1 of an A phase of the main rotor windings 28 may be connected to a starting point 30-B-1 of a B phase of the exciter rotor windings 30. A finish point 28-A-2 of the A phase of the main rotor windings 28 may be connected to a finish point 30-B-2 of the B phase of the exciter rotor windings 30. Similarly, a starting point 28-B-1 of the B phase of the main rotor windings 28 may be connected to a starting point 30-A-1 of an A phase of the exciter rotor windings 30. A finish point 28-B-2 of the B phase of the main rotor windings 28 may be connected to a finish point 30-A-2 of the A phase of the exciter rotor windings 30.

It may be seen that, by supplying the main stator winding 34 with AC power, a rotating field may be produced in the main stator windings 34, namely a stator flux phasor. At the same time, a rotor flux may be induced in the main rotor windings 28 and a magneto motive force (mmf) in the air-gap. The rotor flux may induce current in the main rotor windings 28. Because the exciter rotor windings 30 may be reverse connected to the main rotor windings 28 the same induced current may flow in the exciter rotor windings 30, but in an opposite direction. This induced current in the exciter rotor windings 30 may induce mmf in an air-gap of the exciter generator 24 of opposite direction of the mmf in the main generator air-gap which in turn may induce a voltage in the exciter stator windings 36 of the exciter generator 24.

The switch 38 may be operated to connect the exciter stator windings 36 together, i.e., short the windings 36. When the exciter stator windings 36 are shorted, the induced voltage in the windings 36 may produce a short-circuit current in the exciter stator windings 36. Interaction between the short-circuit current and the exciter rotor flux may produce exciter starting torque. This exciter starting torque may be additive to main starting torque produced by the interaction between the main generator rotor flux and main generator stator current.

The exciter starting torque may be additive to the main starting torque because the main rotor windings 28 and the exciter rotor windings 30 may be reverse connected as explained above. If the main rotor windings 28 and the exciter rotor windings 30 were directly connected, exciter starting torque would develop in a direction opposite to that of the main starting torque and thus would be subtractive to the main starting torque.

Figure 5A:
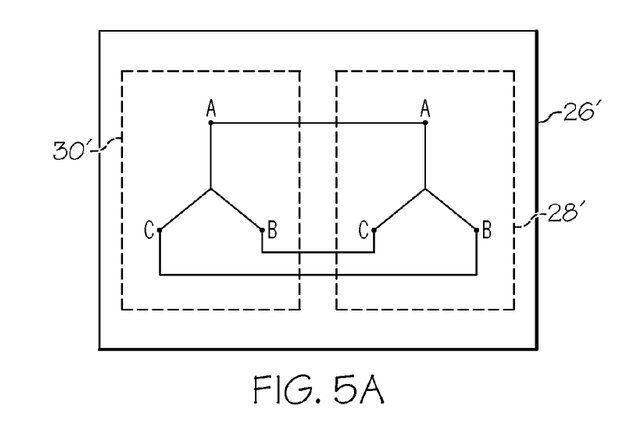
FIGS. 5A, 5B and 5C are block diagrams of three phase rotors of the electric machine of FIG. 2 with various interconnection configurations in accordance with embodiments of the invention.
Figure 5B:
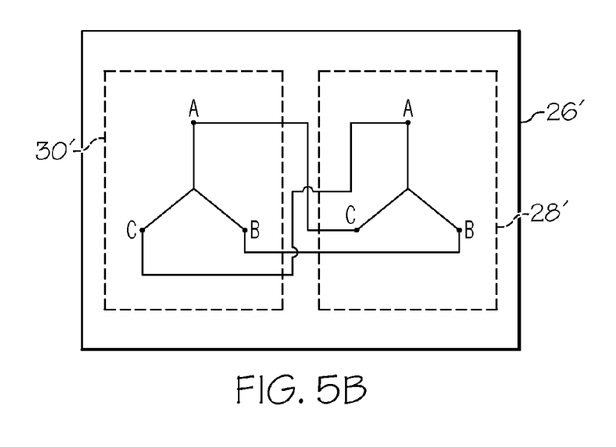
Figure 5C:
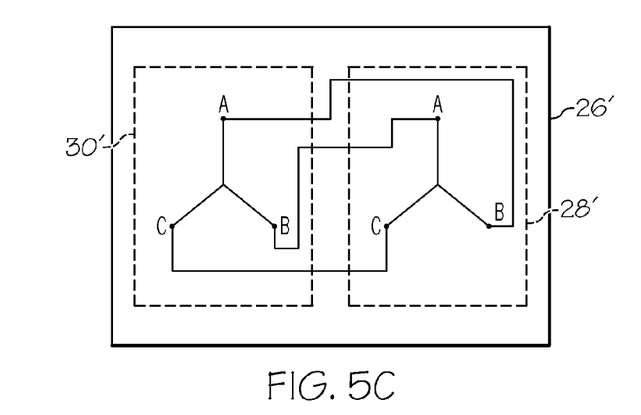

Referring now to FIGS. 5A, 5B and 5C, it may be seen that an exemplary embodiment of the electric machine 14 may be constructed with a rotor 26' having a three phase configuration. Main rotor windings 28' may be reverse connected to exciter rotor windings 30' in various connection combinations.

FIG. 5A shows that an A phase winding of the main rotor windings 28' may be connected to an A phase winding of the exciter rotor windings 30'. A B-phase winding of the main rotor windings 28' may be connected to a C phase winding of the exciter rotor windings 30'. A C-phase winding of the main rotor windings 28' may be connected to a B-phase winding of the exciter rotor winding 30'.

FIG. 5B shows that the A-phase winding of the main rotor windings 28' may be connected to the C-phase winding of the exciter rotor windings 30'. The B phase winding of the main rotor windings 28' may be connected to the B-phase winding of the exciter rotor windings 30'. The C-phase winding of the main rotor windings 28' may be connected to the A-phase winding of the exciter rotor windings 30'.

FIG. 5C shows that the A-phase winding of the main rotor windings 28' may be connected to the B-phase winding of the exciter rotor windings 30'. The B-phase winding of the main rotor windings 28' may be connected to the A-phase winding of the exciter rotor windings 30'. The C-phase winding of the main rotor windings 28' may be connected to the C-phase winding of the exciter rotor windings 30'.

Figure 6:
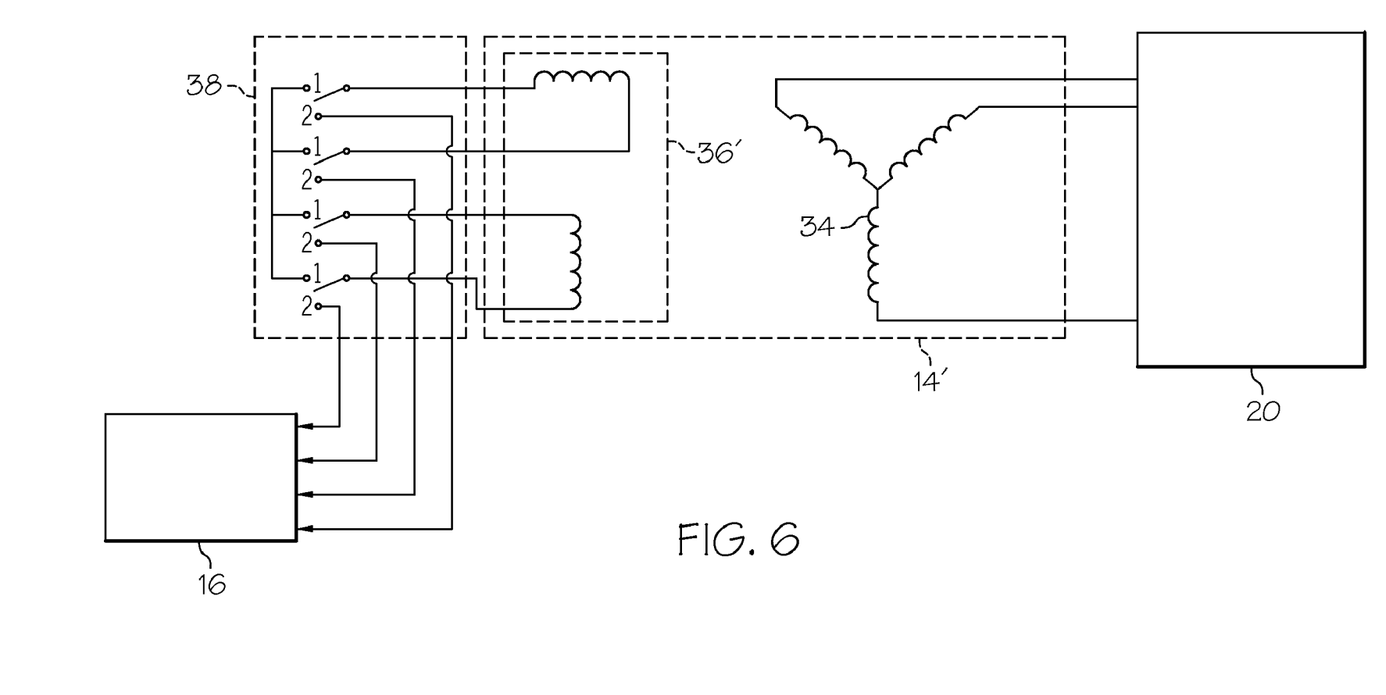
FIG. 6 is a block diagram of an alternative stator configuration of an electric machine in accordance with an embodiment of the invention.

Referring now to FIG. 6, an alternate embodiment of stator configurations of the invention may be seen. In an electric machine 14', the main stator windings 34 are shown in an exemplary three phase configuration. Exciter stator windings 36' may be configured as two phase windings in a quadrature relationship.

Figure 7:
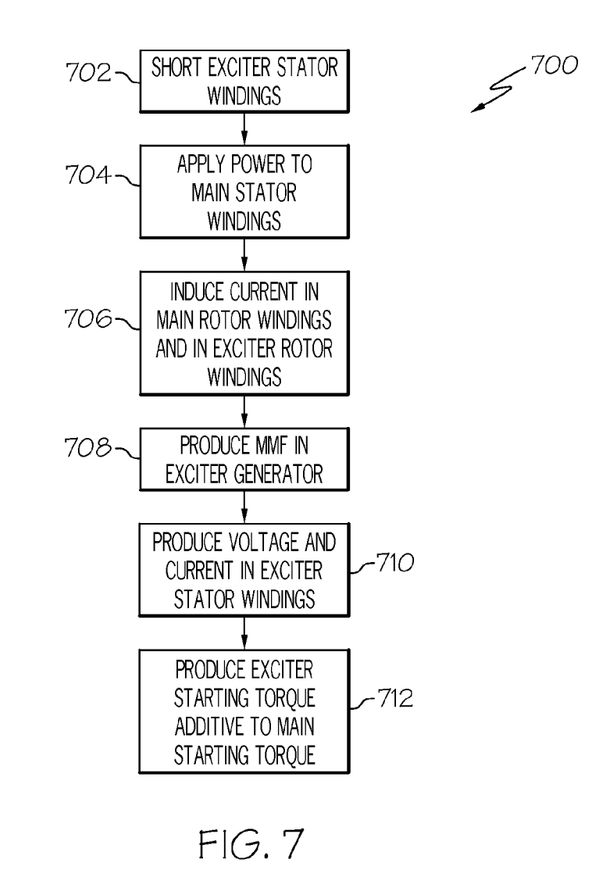
FIG. 7 is a flow chart of a method for operating a starting system in accordance with an embodiment of the invention.

Referring now to FIG. 7, a flow chart 700 may illustrate an exemplary method which may be employed to start an engine the electric machine 14 in accordance with an embodiment the invention. In a step 702, the exciter stator windings may be shorted (e.g., the shorting switch 38 may be closed so that the exciter stator windings may be shorted together). In a step 704, AC power may be applied to a main stator (e.g., the power supply 20 may apply power to the main stator windings 34 of the electric machine 14). In a step 706, current may be induced in rotor windings (e.g., AC power may create a rotating field in the main stator windings 34, namely a stator flux phasor. At the same time a rotor flux may be induced in the main rotor windings 28. The rotor flux may induce current in the main rotor windings 28 and the exciter rotor windings 30 which may be connected to the main rotor windings 28). In a step 708, mmf may be produced in an exciter generator (e.g., induced current in the exciter rotor windings 30 may produce mmf in an air-gap of the exciter generator 24). In a step 710, voltage and current may be produced in the exciter stator windings (e.g., the mmf in the air-gap of the exciter generator may induce a voltage in the exciter stator windings 36 of the exciter generator 24). In a step 712 starting torque may be produced by the exciter generator and may be added to starting torque produced by a main generator (e.g., interaction between the short-circuit current in the exciter stator windings 36 and the exciter rotor flux in the exciter rotor windings 30 may produce exciter starting torque. This exciter starting torque may be additive to main starting torque produced by the main generator 22).

Figure 8:
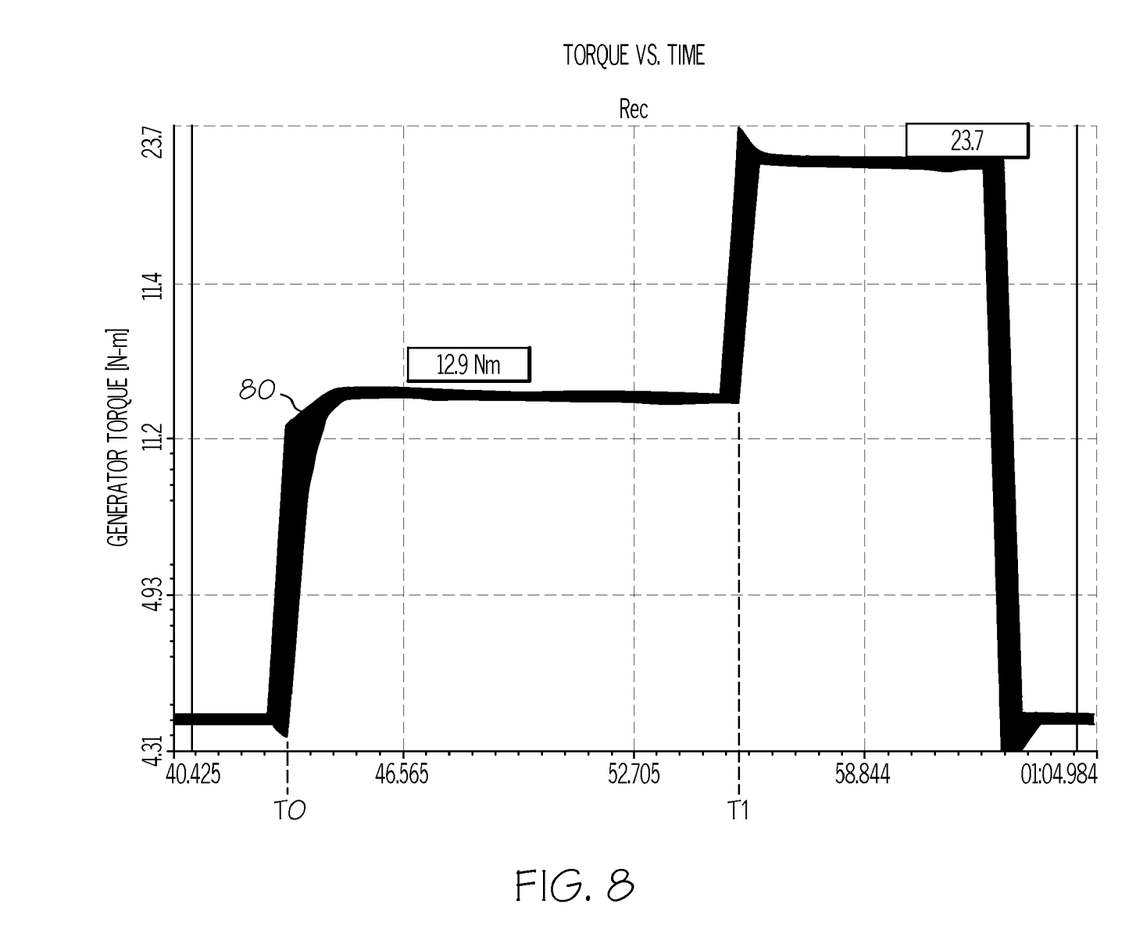
FIG. 8 is a graph showing test results of the starter/generator system of FIG. 1 during start mode in accordance with an embodiment of the invention.

Referring now to FIG. 8, test results plotted on a graph 80 may illustrate effectiveness of the present invention in an exemplary embodiment of the electric machine 14. In the test of FIG. 8, the following parameters were employed:

Voltage of applied power—28V;
Conditions with exciter stator windings open:
   Current in main stator windings—88 A;
   Voltage in exciter stator windings—33V;
   Current in exciter stator windings—0 A;
Conditions with exciter stator windings shorted:
   Current in main stator windings—102 A;
   Voltage in exciter stator windings—11V;
   Current in exciter stator windings—52 A.

It may be seen that at a time T0, with the exciter stator windings 36 open, an initial starting torque produced by the electric machine 14 was about 12.9 Newton meters (Nm). At a later time T1, with the exciter stator windings 36 shorted, the starting torque of the electric machine 14 increased to 23.7 Nm. This may be because the exciter generator 24 may produce starting torque that is additive to starting torque of the main generator 22.

It should be understood, of course, that the foregoing relates to exemplary embodiments of the invention and that modifications may be made without departing from the spirit and scope of the invention as set forth in the following claims.

We claim:

1. A starting system comprising;
  a wound-field electric machine comprising;
    a main generator with main stator windings and main rotor windings;
    an exciter generator with exciter stator windings and exciter rotor windings; and
  a shorting switch for interconnecting the exciter stator windings together when the electric machine is operated in a starting mode so that at least a portion of starting torque is produced by the exciter generator; and
  wherein the exciter rotor windings and the main rotor windings are connected.

2. The starting system of claim 1 wherein the main rotor windings are interconnected with the exciter rotor windings so that current induced in the main rotor windings results in a current in the exciter rotor windings.

3. The starting system of claim 1 further comprising a power supply for supplying constant frequency AC starting power to the main stator windings.

4. The starting system of claim 1 further comprising a power supply for supplying variable frequency AC starting power to the main stator windings.

5. The starting system of claim 1 wherein the exciter rotor windings are reverse connected to the main rotor windings.

6. The starting system of claim 1 wherein the shorting switch selectively disconnects the exciter stator windings from one another and connects the exciter stator windings to a generator control unit when the electric machine is operated in a generating mode.

7. The starting system of claim 1:
  wherein the exciter rotor windings are wound in a two phase quadrature configuration; and
  wherein the main rotor windings are wound in a two phase quadrature configuration.

8. The starting system of claim 1:
  wherein the exciter rotor windings are wound in a three phase configuration; and
  wherein the main rotor windings are wound in a three phase configuration.

9. The starting system of claim 1 wherein the exciter stator windings are wound in a two phase quadrature configuration.

10. A wound field electric machine comprising:
  a main generator with main stator windings and main rotor windings;
  an exciter generator with exciter stator windings and exciter rotor windings; and
  wherein the exciter stator windings are shorted together when the electric machine is operated in a starting mode.

11. The electric machine of claim 10 wherein the exciter rotor windings are reverse connected to the main rotor windings.

12. The electric machine of claim 11:
  wherein the exciter rotor windings are wound in a two phase quadrature configuration;
  wherein the main rotor windings are wound in a two phase quadrature configuration;
  wherein a starting point of an A-phase of the main rotor windings is connected to a starting point of a B-phase of the exciter rotor windings;
  wherein a finish point of the A-phase of the main rotor windings is connected to a finish point of the B-phase of the exciter rotor windings;
  wherein a starting point of the B-phase of the main rotor windings is connected to a starting point of an A-phase of the exciter rotor windings; and
  wherein a finish point of the B-phase of the main rotor windings is connected to a finish point of the A-phase of the exciter rotor windings.

13. The electric machine of claim 11:
  wherein the exciter rotor windings are wound in a three phase configuration; and
  wherein the main rotor windings are wound in a three phase configuration.

14. The electric machine of claim 13:
  wherein an A-phase winding of the main rotor windings is connected to an A-phase winding of the exciter rotor windings;
  wherein a B-phase winding of the main rotor windings is connected to a C-phase winding of the exciter rotor windings; and
  wherein a C-phase winding of the main rotor windings is connected to a B-phase winding of the exciter rotor winding.

15. The electric machine of claim 13:
  wherein an A-phase winding of the main rotor windings is connected to a C-phase winding of the exciter rotor windings;

wherein a B-phase winding of the main rotor windings is connected to a B-phase winding of the exciter rotor windings; and wherein the C-phase winding of the main rotor windings is connected to an A phase winding of the exciter rotor windings.

16. The method of claim 15 wherein the step of supplying power comprises supplying constant frequency power or variable frequency power.

17. The method of claim 15 wherein the step of shorting the exciter stator windings comprises operating a switch to disconnect the exciter stator windings from a generator control unit and to connect the exciter stator windings to one another.

18. The electric machine of claim 13:
wherein an A-phase winding of the main rotor windings is connected to a B-phase winding of the exciter rotor windings;

wherein a B-phase winding of the main rotor windings is connected to an A-phase winding of the exciter rotor windings; and wherein a C-phase winding of the main rotor windings is connected to a C-phase winding of the exciter rotor windings.

19. A method for starting an engine with an electric machine comprising the steps of:
shorting exciter stator windings together;
supplying power to main stator windings of the electric machine when the electric machine is operated in a starting mode;
producing current in exciter rotor windings of the electric machine by application of power to the main stator windings;
producing voltage and current in exciter stator windings with the produced exciter rotor windings current; and
producing starting torque with an exciter generator of the electric machine, which torque is additive to torque produced by a main generator of the electric machine.

20. The method of claim 19 further comprising the step of:
producing main rotor current in main rotor windings by application of power to the main stator windings; and
wherein current in the main rotor windings is opposite in direction from current in the exciter rotor windings so that an exciter rotor produces torque that is additive to torque produced by a main rotor.

* * * * *